(12) United States Patent
Saiga

(10) Patent No.: US 6,532,303 B2
(45) Date of Patent: *Mar. 11, 2003

(54) LINE DIRECTION DECIDING DEVICE, IMAGE INCLINATION DETECTING DEVICE AND IMAGE INCLINATION CORRECTING DEVICE

(75) Inventor: Hisashi Saiga, Tenri (JP)

(73) Assignee: Sharp Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,087

(22) Filed: Jul. 29, 1998

(65) Prior Publication Data

US 2001/0046322 A1 Nov. 29, 2001

(30) Foreign Application Priority Data

Aug. 29, 1997 (JP) .............................................. 9-233626

(51) Int. Cl.[7] .............................. G06K 9/48; G06K 9/46; G06K 9/36; G06K 9/00; H04N 1/04
(52) U.S. Cl. ........................ 382/198; 382/174; 382/181; 382/190; 382/289; 382/290; 358/488
(58) Field of Search ................................. 382/171, 181, 382/198, 290, 170, 176, 177, 174, 289, 173, 185, 186, 190–192, 195, 202, 286, 292; 358/462, 486, 488

(56) References Cited

U.S. PATENT DOCUMENTS

| | | | | |
|---|---|---|---|---|
| 5,191,438 A | * | 3/1993 | Katsurada et al. | 382/290 |
| 5,253,307 A | * | 10/1993 | Wayner et al. | 382/181 |
| 5,471,549 A | * | 11/1995 | Kurosu et al. | 382/290 |
| 5,513,277 A | * | 4/1996 | Huttenlocher | 382/171 |
| 5,668,898 A | * | 9/1997 | Tatsuta | 382/290 |
| 5,781,660 A | * | 7/1998 | Nitta et al. | 382/198 |
| 5,889,884 A | * | 3/1999 | Hashimoto et al. | 382/168 |
| 5,923,790 A | * | 7/1999 | Miwa et al. | 382/198 |
| 6,011,877 A | * | 1/2000 | Ishikawa et al. | 382/290 |

FOREIGN PATENT DOCUMENTS

| | | |
|---|---|---|
| EP | 0 434 415 A2 | 6/1991 |
| JP | 2 277185 | 11/1990 |
| JP | 4-90082 | 3/1992 |
| JP | 5-81474 | 4/1993 |
| JP | 5-225378 | 9/1993 |

OTHER PUBLICATIONS

Hashizume, et al., *A Method of Detecting the Orientation of Aligned Components*, Pattern Recognition Letters 4, vol. No. 2, Apr. 1986, pp. 125–132.

Baird, Henry S., *The Skew Angle of Printed Documents*, SPSE Symposium on Hybrid Imaging, 1987, pp. 21–24.

Akiyama, Teruo et al., "A Chracter Extraction Method from Free Format Printed Documents", Technical Reports of IEICE No. PRL80–70, vol. 80, No. 231, Jan. 23, 1981, pp. 9–16. Non–English.

Nagao "Image Recognition Theory", Corona Publishing Co., Ltd., 1983, pp. 85–87. Non–English.

* cited by examiner

Primary Examiner—Leo Boudreau
Assistant Examiner—Daniel G. Mariam
(74) Attorney, Agent, or Firm—Nixon & Vanderhye P.C.

(57) ABSTRACT

A line-direction deciding device that can decide the direction of lines in an image having a complicated layout of characters as well as line directions other than vertical and horizontal line directions. The present invention provides a line-direction deciding device that extracts character elements (image components) from an image, examines in which direction the character elements are most densely distributed and decides by majority the direction of lines of characters within a processable area as well as an image inclination correcting device that corrects an image for inclination according to a processing result made by the line-direction deciding device provided with image-inclination detecting means.

12 Claims, 17 Drawing Sheets

FIG.4

| sx[0] | sy[0] | ex[0] | ey[0] |
|---|---|---|---|
| sx[1] | sy[1] | ex[1] | ey[1] |
| . | . | . | . |
| . | . | . | . |
| . | . | . | . |
| sx[N-1] | sy[N-1] | ex[N-1] | ey[N-1] |

FIG.6

| | |
|---|---|
| D[0][0] | D[0][1] |
| D[1][0] | D[1][1] |
| . | . |
| . | . |
| . | . |
| D[N-1][0] | D[N-1][1] |

FIG.7

| VALUE j0 | OUTPUT |
|---|---|
| 0 | ZERO DEGREE (HORIZONTAL DIRECTION) |
| 1 | 90 DEGREES (VERTICAL DIRECTION) |
| 2 | JUDGMENT IS IMPOSSIBLE |

FIG.9

| D[0][0] | D[0][1] | D[0][2] | D[0][3] |
|---|---|---|---|
| D[1][0] | D[1][1] | D[1][2] | D[1][3] |
| . | . | . | . |
| . | . | . | . |
| . | . | . | . |
| D[N-1][0] | D[N-1][1] | D[N-1][2] | D[N-1][3] |

FIG.10A
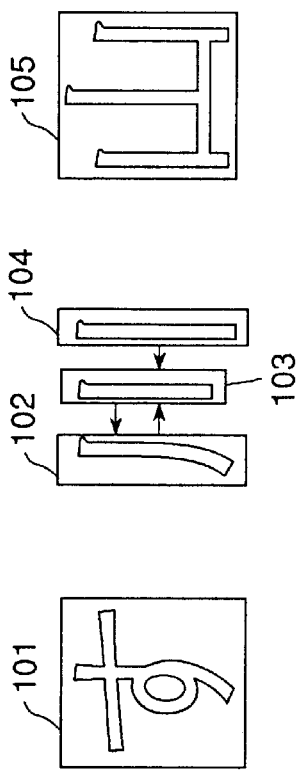
FIG.10B
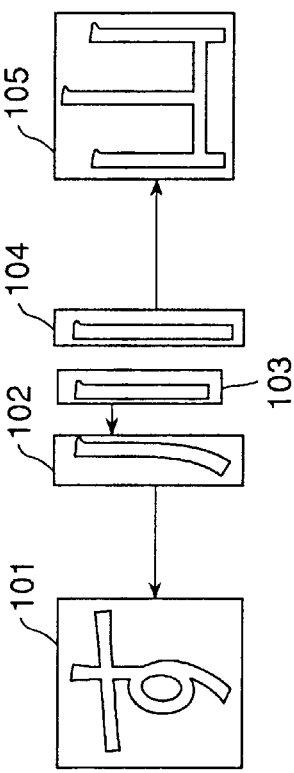
FIG.10C

FIG.12

| D[0][0] | D[0][1] | D[0][2] | D[0][3] | D[0][4] | D[0][5] |
|---|---|---|---|---|---|
| D[1][0] | D[1][1] | D[1][2] | D[1][3] | D[1][4] | D[1][5] |
| . | . | . | . | . | . |
| . | . | . | . | . | . |
| . | . | . | . | . | . |
| D[N-1][0] | D[N-1][1] | D[N-1][2] | D[N-1][3] | D[N-1][4] | D[N-1][5] |

FIG.13

| VALUE j0 | OUTPUT |
|---|---|
| 0 | ZERO DEGREE (HORIZONTAL DIRECTION) |
| 1 | 30 DEGREES |
| 2 | 60 DEGREES |
| 3 | 90 DEGREES (VERTICAL DIRECTION) |
| 4 | 120 DEGREES |
| 5 | 150 DEGREES |
| 6 | JUDGMENT IS IMPOSSIBLE |

FIG.17

| D[0][0] | D[0][1] | D[0][2] | D[0][3] | D[0][4] | D[0][5] |
|---|---|---|---|---|---|
| D[1][0] | D[1][1] | D[1][2] | D[1][3] | D[1][4] | D[1][5] |
| . | . | . | . | . | . |
| . | . | . | . | . | . |
| . | . | . | . | . | . |
| D[N-1][0] | D[N-1][1] | D[N-1][2] | D[N-1][3] | D[N-1][4] | D[N-1][5] |

LINE DIRECTION DECIDING DEVICE, IMAGE INCLINATION DETECTING DEVICE AND IMAGE INCLINATION CORRECTING DEVICE

BACKGROUND OF THE INVENTION

1. Technical Field

The present invention relates to a line-direction deciding device, an image-inclination detecting device and an image-inclination correcting device, all of which are adapted to use in a printed image processing device and a character recognizing device.

2. Description of the Related Art

In processing an image of a printed original in particular for recognizing characters therein, it is very important to decide the direction of lines of characters thereon, i.e., whether characters are printed in vertical lines or horizontal lines. This is because the character extracting processing in many cases depends on the direction of character lines.

Many conventional methods for deciding a line-direction use the marginal distribution in vertical and horizontal directions of an input image. A typical method is described in Technical Reports of IEICE No. PRL80-70 published by The Institute of Electronics, Information and Communication Engineer. This method uses blank lines extracted by the marginal distribution, which depend upon vertical character line and horizontal character line.

A line-direction deciding method not using the marginal distribution has been also proposed, for example, in Japanese Laid-Open Patent Publication No. 4-90082. This method prepares a histogram of run length of white pixels (blanks) in vertical and horizontal directions and discriminates the direction of lines by comparing a peak of white pixels in vertical direction with a peak of white pixels in horizontal direction. The method is based on the fact that characters typed in horizontal lines have smaller horizontal spacing than vertical spacing while characters typed in vertical lines have smaller vertical spacing than horizontal spacing.

The above-described conventional line-direction deciding methods and devices, however, involve the following problems:

The first problem is that the method using the marginal distribution may sometimes fail in obtaining a correct discrimination of a character line direction on a printed image with a complicated layout of characters therein. This is because whole-area marginal distribution can not always detect blanks around respective character strings on an original image having a complicated layout of characters therein.

The second problem is that the method using run-length of blanks extracts information on runs of blanks from a wide area of an input image, which is usable only for the line-direction deciding process and cannot be used in many cases for other kinds of processing, e.g., character recognizing processing. In other words, much time and many operating resources must be consumed for obtaining information usable for only extracting the direction of lines. This decreases the efficiency of operation of the device.

The third problem is that the method using run-length of blanks is limited in detectable line directions as shown in FIG. 1. Namely, the method cannot discriminate any direction other than vertical 20 and horizontal 21 directions and directions 22 and 23 having an angle of a multiple of 45°, in which run lengths can be naturally decided. This means that an image input from a printed sheet at a large inclination angle cannot be correctly processed without previously being corrected for its inclination. The method may have a trouble with images input from a hand-operated scanner or a camera, which are apt to easily be inclined. For discriminating the direction having an angle of a multiple of 45°, it is necessary to excessively access the image storage means (image memory) for calculating a run-length in that direction as compared with the discrimination of the horizontal or vertical direction. Scanning the image memory at an inclination results in further increasing processing time due to accessing discrete addresses therein by calculating these addresses. Of course, the method using the vertical and horizontal marginal distribution cannot discriminate any direction other than the vertical and horizontal directions.

The fourth problem is that both the methods using the marginal distribution and run-length of blanks are limited in detectable line directions and, therefore, processing results obtained from an input image by these methods cannot be used for detecting and/or correcting inclination of the image. Consequently, the conventional line-direction deciding device must be provided with a separate image-inclination detecting device and a separate image-inclination correcting device. This makes the system large and very expensive.

Accordingly, the present invention is directed to a line-direction deciding device that can process any image with a complicated layout of characters included therein, providing many interprocessing results usable in common for other kinds of processing (e.g., character recognition), and can be easily expanded to discrimination of any directions other than vertical and horizontal directions. The present invention is also directed to an image inclination detecting device and an image inclination correcting device, both of which effectively use the processing results obtained by the line-direction deciding device.

SUMMARY OF THE INVENTION (1) It is therefore one object of the present invention to provide a line-direction deciding device which comprises image storing means for storing an input image, character-element-extracting means for extracting character elements from the image stored in the image storing means, character-element density calculating means for determining the density of character elements in each of predetermined directions and line-direction deciding means for deciding a character line direction by detecting a direction in which character elements are most densely distributed.

(2) Another object of the present invention is to provide a line-direction deciding device set forth in the paragraph (1), which is further characterized in that the predetermined plural directions are directions of divisions formed by dividing a circle with center at a representative point of a bounding rectangle of the character element.

(3) Another object of the present invention is to provide a line-direction deciding device set forth in the paragraph (1) or (2), which is further characterized in that the character-element density calculating means is provided with means for determining a shortest distance from the character element to each of adjacent character elements in each of the predetermined plural directions and the line-direction deciding means compares the distances between the character elements in respective directions and decides by majority the direction in which character-elements are most densely distributed.

(4) Another object of the present invention is to provide a line-direction deciding device set forth in the paragraph (1) or (2), which is further characterized in that the character-element density calculating means includes means for determining first a shortest distance from a character element to a neighbor in each of the predetermined directions and then deciding a larger distance between the character elements in a direction as an interelement distance in that direction and the line-direction deciding means compares the distances between the character elements in respective directions and decides by majority the direction in which character elements are most densely distributed.

(5) Another object of the present invention is to provide a line-direction deciding device set forth in the paragraph (2), which is further characterized in that the character element density is determined by counting how many representative points of the bounding rectangles of respective character elements included in respective divisions of the circle with center at a character element.

(6) Another object of the present invention is to provide an image-inclination detecting device that comprises the line-direction deciding device set forth in any one of paragraphs (1) to (5) and image-inclination detecting means for detecting an inclination of an input image by comparing the character line direction determined by the line-direction deciding device to a reference line direction.

(7) Another object of the present invention is to provide an image-inclination correcting device that comprises the image-inclination detecting device set forth in the paragraph (6) and image-inclination correcting means for correcting an inclination of an input image according to a result obtained by the image-inclination detecting device.

BRIEF DESCRIPTION OF THE DRAWINGS

In the drawings,

FIG. 4 shows an exemplified construction of a character-element buffer used in the first embodiment of the present invention;

FIG. 6 shows an exemplified construction of a buffer for character-element distance data used in the first embodiment of the present invention;

FIG. 7 shows an example of a number-to-direction table used in the first embodiment of the present invention;

FIG. 9 shows an exemplified construction of a buffer for character-element distance data used in the second embodiment of the present invention;

FIGS. 10A, 10B and 10C are views for explaining an advantage of a distance between character elements in the second embodiment of the present invention;

FIG. 12 shows an exemplified construction of a buffer for character-element distance data used in the third embodiment of the present invention;

FIG. 13 shows an example of a table for storing number-to-direction data used in the third embodiment of the present invention;

FIG. 17 shows an exemplified construction of a character-element density buffer used in the fourth embodiment of the present invention;

DETAILED DESCRIPTION OF PREFERRED EMBODIMENT

Figure 1:
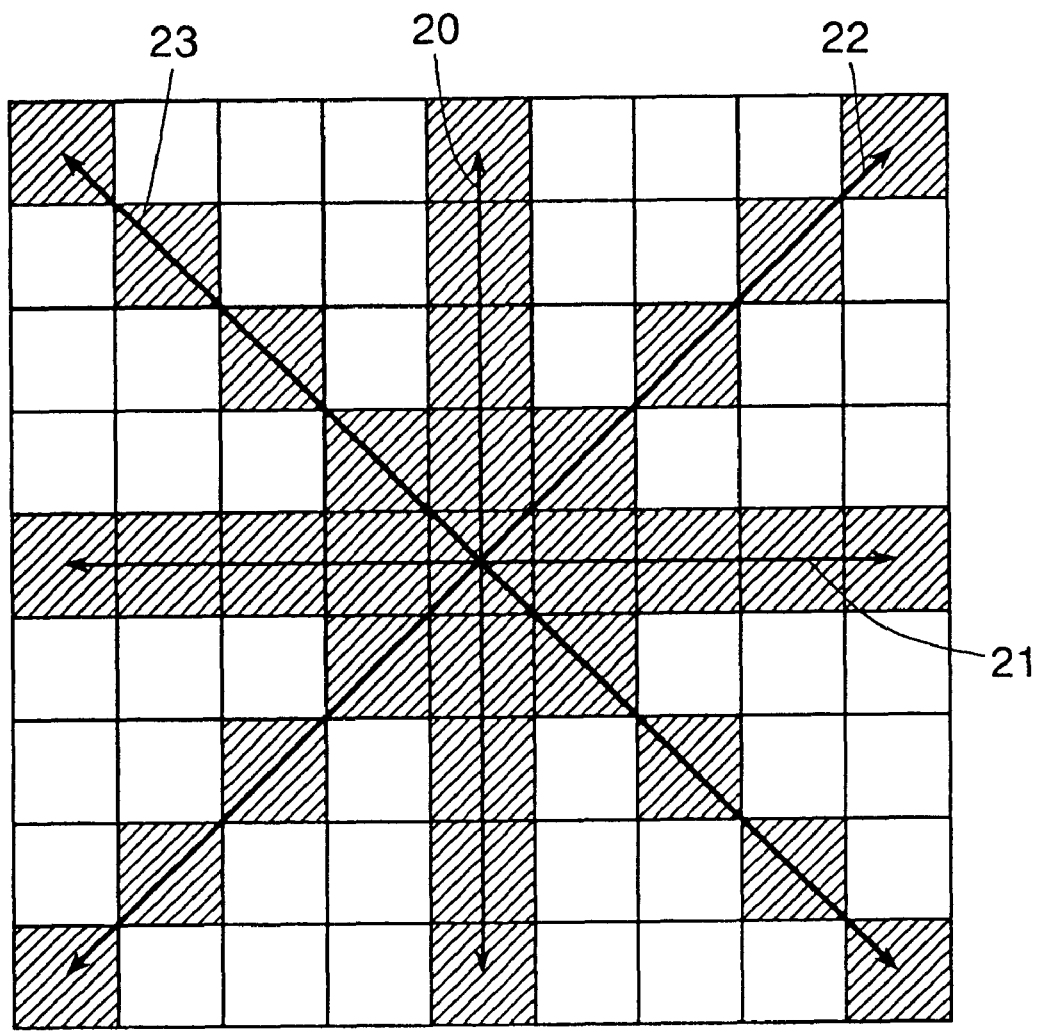
FIG. 1 is a view for explaining only limited directions allowing run lengths to be naturally defined.
Figure 2:
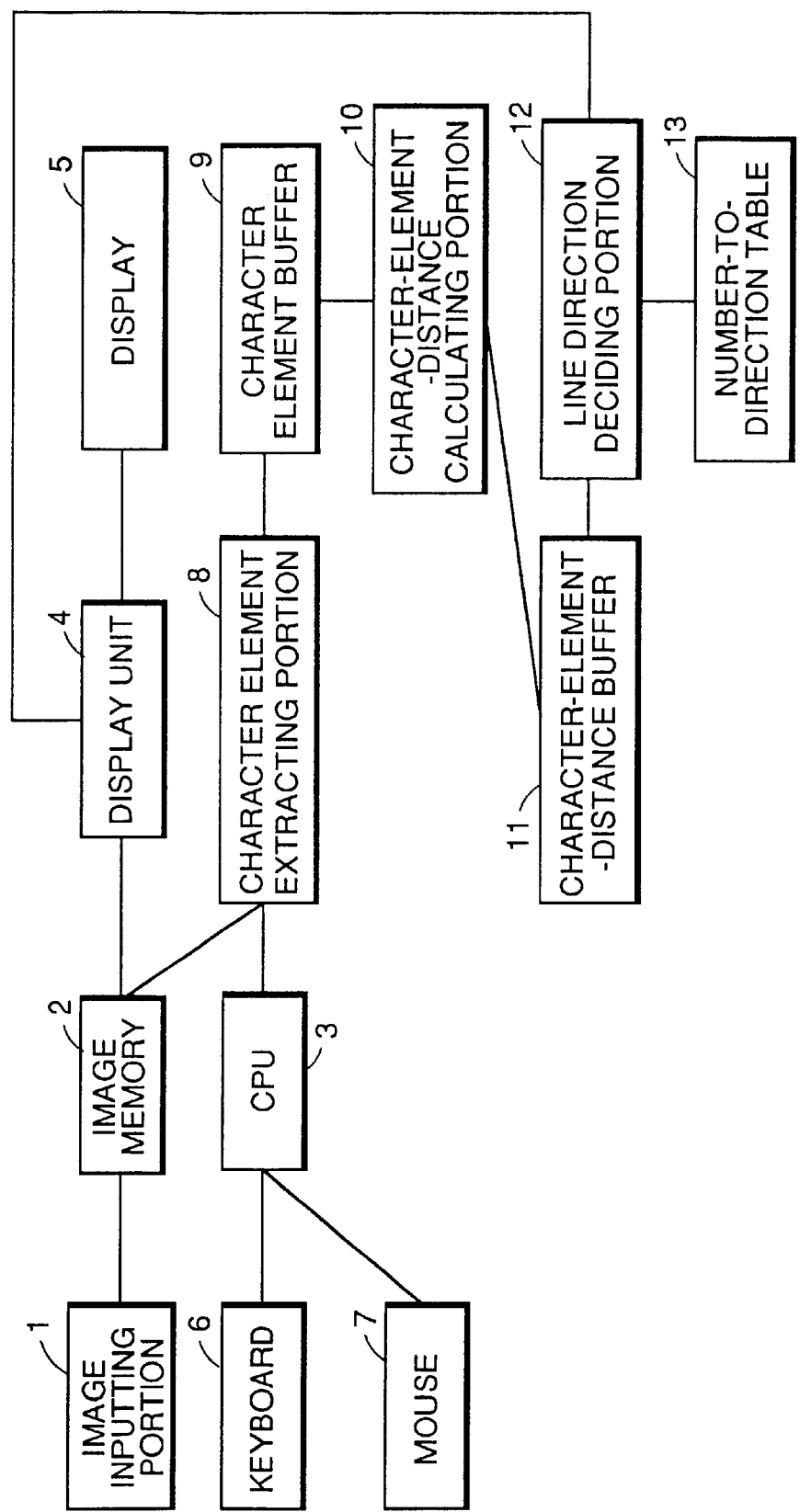
FIG. 2 is a block diagram showing a construction of an apparatus for carry-out a first, second and third embodiments of the present invention.
Figure 3:
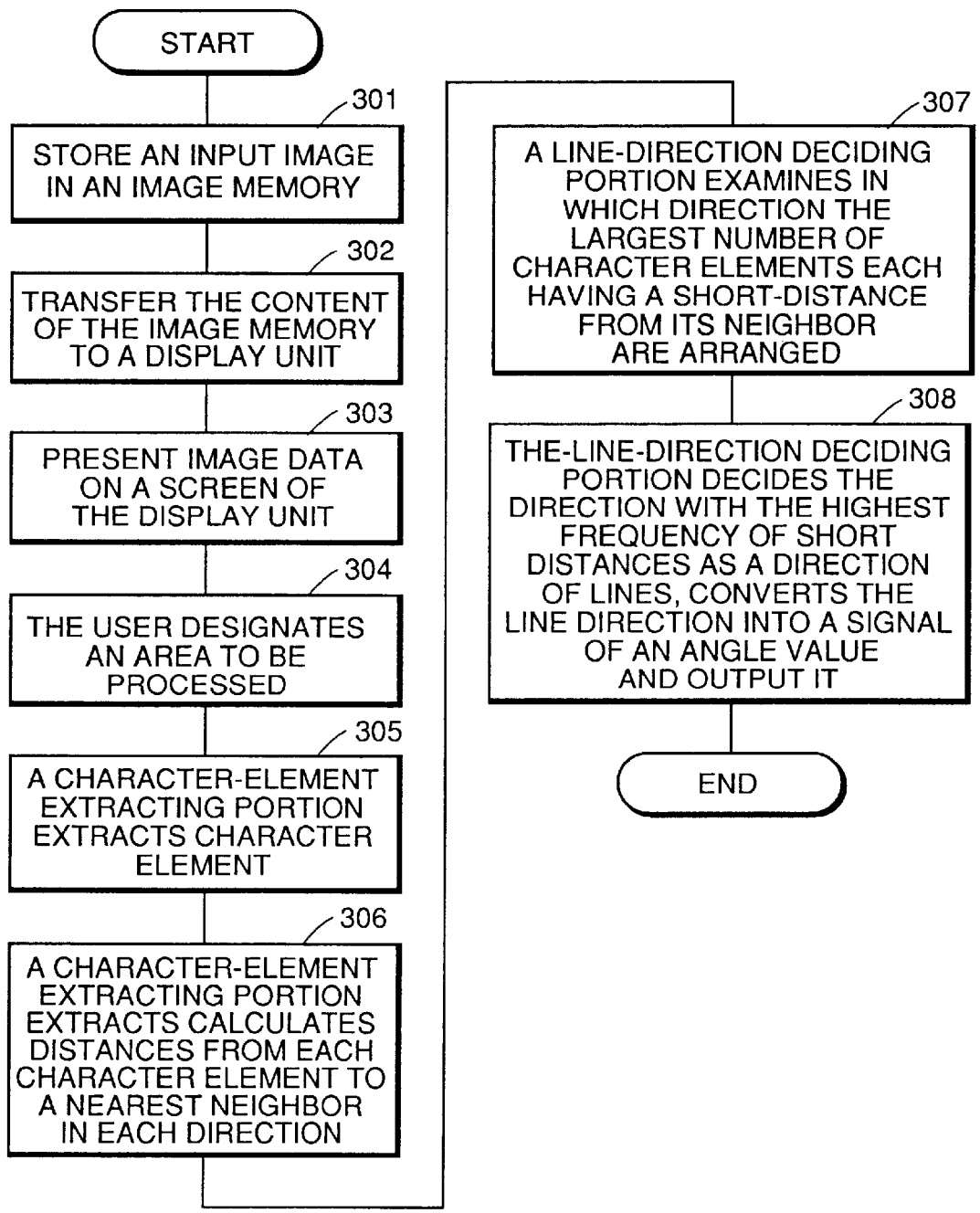
FIG. 3 is a flow chart describing a processing procedure for the first, second and third embodiments of the present invention.

FIG. 2 is a block diagram of a line-direction deciding device that is a first embodiment of the present. FIG. 3 is a flow chart describing steps of processing an input image by the first embodiment of the present invention.

Referring to FIGS. 2 and 3, the first embodiment of the present invention will be described below in detail.

An image information printed on a sheet of paper printed thereon is input through an image inputting portion 1 composed of a scanner or a camera and stored in an image memory 2 (Step 301). The content of the image memory 2 is transferred to a display unit 4 (Step 302), which then presents the received image data on a display 5 (Step 303).

Any point on the input image is located, hereinafter if necessary, by its perpendicular distances (x, y) from the two axes of a pixel-based coordinate system whose origin (0, 0) is for example at the top left point of the image. Character lines on the image are called "horizontal" when characters are written in horizontal lines and "vertical" when characters are written in vertical lines.

A user designates a processable area on the input image by using a keyboard 6 or a mouse 7. The specified area data is stored in CPU 3 (Step 304). In this case, it is presumed that the processable area does not include differently directed character lines. This area is preferable not to contain other areas of, e.g., a photo image and a line drawing image. The processable image-area may be designated as a rectangle that is specified by a pair of coordinates (X0, Y0) of its top-left point with coordinates (X1, Y1) of a bottom-right point. The area can be also designated by using a further complicated method. In this instance, the area designation is conducted manually by the user but it may be conducted automatically by applying any of conventional automatic area-partitioning methods. Typical one is described in Japanese Laid-Open Patent Publication No. 5-225378.

The CPU 3 transfers location data of the specified processable image-area to a character-element extracting portion 8 which in turn extracts character elements referring to the content of the image memory 2 and stores the extracted data into a character-element buffer 9 (Step 305). In this specification, the character-element extraction is conducted for so-called black pixels having predetermined values in practice.

The purpose of extracting character-elements is to examine in which direction characters are most densely distributed. Accordingly, extraction of a character itself is best but difficult because which part of an image area composes a character cannot be found before character recognition processing. Therefore, image elements that can be considered as parts composing a character are used as alternatives. Representative is an image connecting area which can be extracted by a method disclosed by Nagao in a book <Image Recognition Theory> published by Colona Co., 1983, p. 85. Other known methods may be also applied. According to the present invention, it is possible to decide the direction of lines of characters, alphanumeric characters and symbols on an input image without previously doing character recognition processing.

A method for obtaining a bounding rectangle of a connecting component, which has been proposed by the present applicant in Japanese Laid-Open Patent Publication No. 5-51474, can be applied if it is sufficient to know only a bounding rectangle of a connecting area on an input image. The character-element extracting portion 8 extracts a bounding rectangle of the connecting area by specifying a pair of coordinates of its top-left point (sx, sy) and bottom-right point (ex, ey) and stores the paired coordinates in a character-element buffer 9. The bounding rectangle may not be limited to the above expression and can be specified otherwise.

FIG. 4 shows an example of construction of the character-element buffer 9 wherein the data is two-dimensionally stored. Namely, vertically arranged records correspond to respective character-elements and horizontally arranged records correspond respectively to x- and y-coordinates of the top-left end and x- and y-coordinates of the bottom-right end of the bounding rectangle of the character element. In FIG. 4, a bounding rectangle of an i-th character-element (i=0, 1, . . . , N−1, where N is the number of character-elements) is defined by its top-left-point coordinates of sx[i] and sx[y] and bottom-right-point coordinates of ex[i] and ey[i].

It is natural that representation of the character-element is not to be restricted to the bounding rectangle of a connecting area. For example, the character element may be represented by coordinates of its center point or gravity point instead of the coordinates of the bounding rectangle. Furthermore, it is also possible to use a character element not based on the connecting component or a bounding rectangle of the character component as disclosed by the present applicant in Japanese Laid-Open Patent Publication No. 02-277185. It is of course possible to use a character itself as a character-component when the character has been extracted by the separate apparatus. In this instance, the character-element extracting portion 9 can be omitted from the construction block-diagram (FIG. 2) of the line-direction deciding device.

A character-element distance calculating portion 10 calculates distances of each character element from its neighbors in different directions and stores smallest one of the calculated distance values in a character-element-distance buffer 11 (Step 306).

Figure 5C:
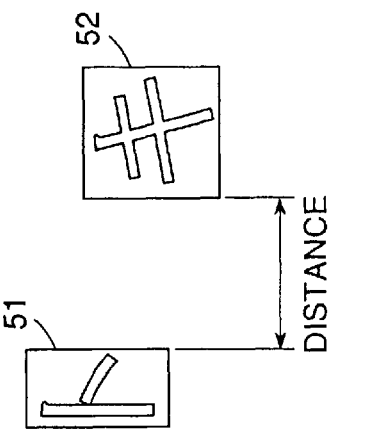
FIGS. 5A, 5B, 5C and 5D are views for explaining a distance between character elements in the first embodiment of the present invention.
Figure 5B:
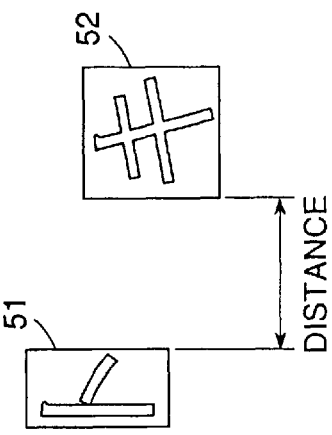
Figure 5A:
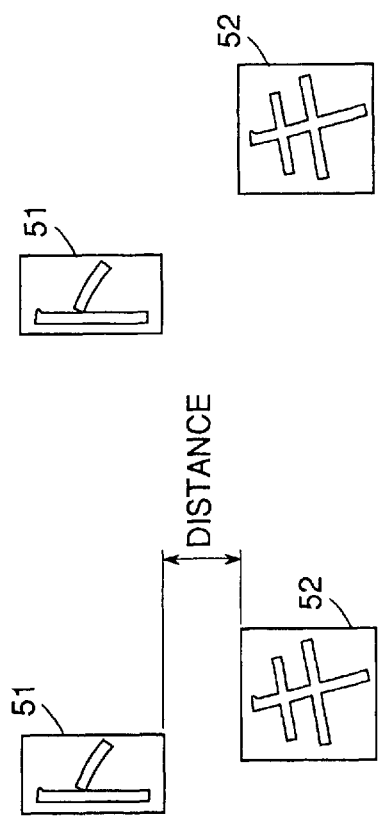
Figure 5D:
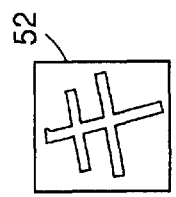

It can be said that the smaller the distance between character elements is, the more densely the character elements are distributed. The distance value is in an inverse relation to the character-element density value but both are the same in substance. A character-element distance may be defined in various ways. In other words, it is not always needed to define a distance between two character elements in distinction from normal distance measurements. Referring to FIGS. 5A to 5D, character-element distances will be determined by way of example for characters " ├ " 51 and " ┼ " 52. The character element " ├ " 51 is represented by sx[0], sy[0], ex[0], ey[0] and the character element " ┼ " 52 are represented by sx[1], sy[1], ex[1], ey[1]. Only when x-coordinate ranges of two bounding rectangles of the character-elements are overlapped, a pair of nearest y-coordinate values of the nearest horizontal sides of both rectangles are selected and a difference between those y-coordinate values is defined as a vertical distance between the character elements. FIG. 5A shows a so-defined distance and FIG. 5B shows not so-defined case. Only when y-coordinate-value ranges of two bounding rectangles of character-elements " ┼ " 51 and " ├ " 52 are overlapped (in the case of FIG. 5C), a pair of nearest x-coordinate values of nearest vertical sides of both the bounding rectangles are selected and a difference between those x-coordinate values is defined as a horizontal distance (sx[1]−ex[0]) between the character elements. FIG. 5C shows a so-defined distance and FIG. 5D shows not so-defined case. Only when x-coordinate ranges of two bounding rectangles of the character-elements are overlapped (in the case of FIG. 5A), a pair of nearest x-coordinate values of the nearest horizontal sides of both rectangles are selected and a difference between the x-coordinate values is defined as a vertical distance [sy[1]−ey[0]) between the character elements.

In the above-mentioned cases, the character lines are put in one of two directions—horizontal and vertical. Although embodiments will be also described for discriminating character lines to be horizontal or vertical, the definition of a distance between two character elements may be limited to the above and line directions other than vertical and horizontal directions can be also discriminated depending upon the different definition of character-element distances.

FIG. 6 shows an exemplified construction of the character-element distance buffer 11 adapted to store the distance data of FIGS. 5A to 5D. The buffer 11 two-dimensionally stores the data. Namely, vertically arranged records correspond to respective character-elements and horizontally arranged records correspond to shortest horizontal and vertical distances of a character-element to its neighbors in respective directions. In the buffer 11, an i-th character-element (i=0, 1, . . . , N−1, where N is the number of character-elements) is defined by the shortest horizontal distance D(i) (0) to a neighbor in horizontal direction and the shortest vertical distance D[i][1] to a neighbor in vertical direction.

The character-element distance calculating portion 10 calculates distances of each character element from neighbors in respective directions referring to the content of the character-element buffer 9 and stores the smallest of the calculated distance values in a character-element-distance buffer 11 according to the following procedure:

(1) Each element D[i][j] (i=0, 1, . . . N−1, J=0) is initialized with a value UD which is equal to max(1x, 1y), where 1x is a horizontal width and 1y is a vertical height of a processable area.
(2) i=0
(3) J=0
(4) k=0
(5) A distance between an i-th character-element and a j-th character-element is calculated in direction k (k=0 is a horizontal direction and k=1 is a vertical direction).

(6) When a value d has been defined, D[i][k]=min (D[i][k], d) is determined. Namely, D[i][k] is updated by d if d is smaller than the current D[i][k].
(7) k=k+1
(8) The process returns to step (5) if k is smaller than 2.
(9) j=j+1
(10) j+=1, if j==i.
(11) The process returns to step (4) if j is smaller than N.
(12) i=i+1
(13) The process returns to step (3) if i is smaller than N.

In distinction from normal distance measurements, the character element distance is not defined between two optional character-elements as described above and any distance between neighboring character-elements in certain directions may not be defined. Therefore, there may be such a case that no distance is defined between nearest neighbors. In this instance, a value apparently distinct from all defined distances may be stored as undefined distance data for a corresponding element D[i][j]. In the embodiment of the present invention, the character-element distance calculating portion 10 uses UD=max(1x, 1y) (where 1x is a processable area width in horizontal direction and 1y is a processable area height in vertical direction) to commonly represent undefined horizontal and vertical distances as described before in the procedure of the portion 10. The use of such an extraordinary value in common for undefined horizontal and vertical distances allows all stored values to be treated without distinction when determining the shortest distances in different directions by comparing the stored data. Any value is usable to represent an undefined distance if it is a practically impossible distance. It is also possible to provide each distance data with a flag indicating the defined or undefined. A flag corresponds to a record in the character-element buffer 9 or the character-element distance buffer 11.

Any UD (undefined distance) value may have the same effect as described above if it is larger than a possible distance value and used in common for undefined horizontal and vertical distance.

As very small or very large character elements are undesirable for discriminating a space between characters, the character-element distance calculating portion 10 stores the UD value in D[i][0] and D[i][1] for such undesirable character elements and ignores the undesirable character elements when seeking a nearest character element from a normal character element.

In case if the character elements extracted for discriminating the direction of lines will not be used in an after-processing stage, it is possible to previously remove the undesirable character elements from the character element buffer 9. Some criterion for discriminating the undesirable character elements may be a suitable threshold or a certain difference from the mean value. It is also possible to use some shape or other suitable criterion than the above size terms.

A line-direction deciding portion 12 examines the frequency of short distances between character-elements in horizontal and vertical directions with reference to the content of the character-element distance buffer 11 and decides by majority that the horizontal or vertical direction is more dense with character elements (Step 307).

Namely, the line-direction portion 12 first counts the number M[0] and the number M[1] for each i (i=0,1, . . . , N−1, where N is the number of character elements), which distance values satisfy the conditions:

D[i][0]<D[i][1] and D[i][0]>D[i][1].

M[0] and M[1] may be defined otherwise than the above. For example, it is also possible to omit counting M[0] and M[1] for a character element i that cannot have a certain or more difference between D[i][0] and D[i][1].

Next, the portion 12 determines a value j0 at which M[j0]=max(M[0], M[1]) is obtained. This is to seek the direction in which the highest frequency of the short distances of character-elements is obtained. If there is a plurality of j0, the portion 12 considers that decision is impossible and sets j0 to be equal to the number of possible directions (2 in this instance).

The correlation between a value M[ ] and a line-direction can be defined otherwise than the above. For example, the portion 12 may always output, instead of the judgment "decision being impossible," a numeric code indicating either of the two directions and may separately output a difference between the frequencies of the two directions to indicate the probability of the direction of the highest frequency relative to the direction of the second frequency.

Finally, the line-direction deciding portion 12 converts the value j0 indicating the direction of the highest frequency or other information (e.g., the decision being impossible) into an angle of the line direction or other information code with reference to the number-to-direction table 13 and outputs the converted value (Step 308). The number-to-direction table 13 is shown by way of example in FIG. 7. The output of the line-direction deciding portion 12 is transferred to a display unit 4 as shown in FIG. 2. Of course, the output of the line-direction deciding device may be transferred through a Suitable separate interface to any other device such as a character recognition device that needs the information.

<Second Mode for Carrying Out the Invention>

In another (second) embodiment of the present invention, the definition of a distance between character elements, which is used in the first embodiment, is so modified that the decision of the line direction may attain higher accuracy. Referring to FIGS. 2 and 3 in common, the difference of the second embodiment from the first embodiment will be described below. Other portions of the embodiment are similar to those of the first embodiment.

A character-element distance calculating portion 10 calculates distances of each character element from its neighbors in different directions referring to the content of the character-element buffer 9 and stores the smallest of the calculated distance values in a character-element-distance buffer 11 (Step 306). At this step, the first embodiment did not distinguish the location of the nearest neighbor relative to the character element (hereinafter called "character element I"), e.g., right or left from the character element I in the horizontal direction or above or below in the vertical direction. On the contrary, the second embodiment distinguishes the relative location (orientation) of the neighbor in the directions. In other words, the first embodiment selects, for each character element I, the nearest neighbors one in the horizontal direction and one in the vertical direction and compares distances determined from the nearest neighbors in the respective directions. On the contrary, the second embodiment calculates distances from the element I to nearest neighbors located above and below (in each opposite direction) in the vertical direction and left and right (in each opposite direction) in the horizontal direction and uses a larger of the two distances (in each opposite direction) measured in respective (the vertical and horizontal) directions as the vertical and horizontal distance values instead of the vertical and horizontal distance values defined by the first embodiment.

Figure 8B:
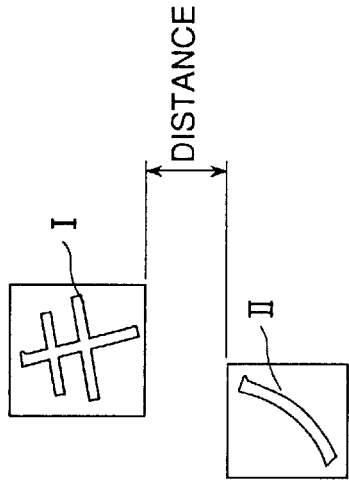
FIGS. 8A, 8B, 8C and 8D are views for explaining a distance between character elements in the second embodiment of the present invention.
Figure 8D:
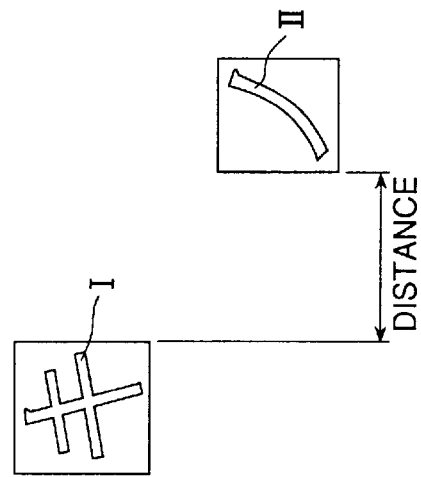
Figure 8A:
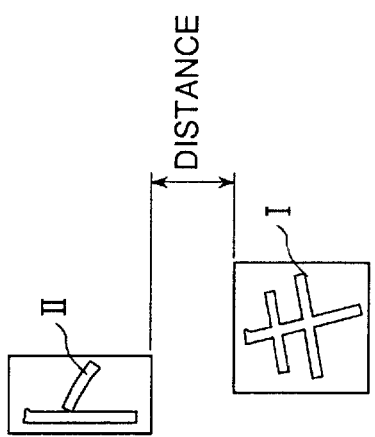

Referring to FIGS. 8A to 8D, a method of determining a distance from a character element (I) serving a reference to character elements II located above, below, left and right respectively will be described as follows:

(1) Only in the case when two character elements I and II have an overlap of their x-coordinate ranges but no overlap of their y-coordinate ranges and the y-coordinate value of any point included in the element II is smaller than the y-coordinate value of any point included in the element I (i.e., the element II exists above the element I), an upward distance from the element I to the element II is defined as a difference between the y-coordinate value of the upper side of a bounding rectangle of the element I and the y-coordinate value of the lower side of a bounding rectangle of the element II (as shown in FIG. 8A).

(2) Only in the case when two character elements I and II have an overlap of their x-coordinate ranges but no overlap of their y-coordinate ranges and the y-coordinate value of any point included in the element II is larger than the y-coordinate value of any point included in the element I (i.e., the element II exists below the element I), a downward distance from the element I to the element II is defined as a difference between the y-coordinate value of the lower side of a bounding rectangle of the element I and the y-coordinate value of the upper side of a bounding rectangle of the element II (as shown in FIG. 8B).

Figure 8C:
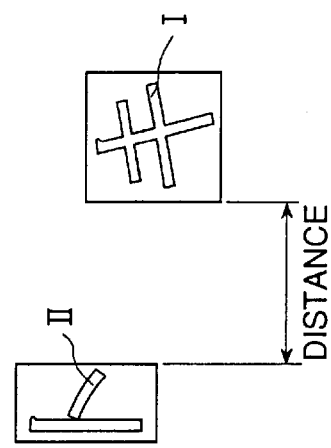

(3) Only in the case when two character elements I and II have an overlap of their y-coordinate ranges but no overlap of their x-coordinate ranges and the x-coordinate value of any point included in the element II is smaller than the x-coordinate value of any point included in the element I (i.e., the element II exists on the left hand of the element I), a leftward distance from the element I to the left element II is defined as a difference between the y-coordinate value of the left side of a bounding rectangle of the element I and the y-coordinate value of the right side of a bounding rectangle of the element II (as shown in FIG. 8C).

(4) Only in the case when two character elements I and II have an overlap of their y-coordinate ranges but no overlap of their x-coordinate ranges and the x-coordinate value of any point included in the element II is larger than the x-coordinate value of any point included in the element I (i.e., the element II exists on the right hand of the element I), a leftward distance from the element I to the left element II is defined as a difference between the y-coordinate value of the right side of a bounding rectangle of the element I and the y-coordinate value of the left side of a bounding rectangle of the element II (as shown in FIG. 8D).

FIG. 9 shows an exemplified construction of a character-element distance buffer 11 adapted to store the distance data of FIGS. 8A to 8D. Similarly to the buffer used in the first embodiment, the buffer 11 two-dimensionally stores the data, i.e., vertically arranged records correspond to respective character-elements and horizontally arranged records correspond to shortest distances of a character-element to its nearest leftward neighbor, rightward neighbor, upward neighbor and downward neighbor respectively. In the character-element distance buffer 11, as shown in FIG. 9, an i-th character-element (i=0, 1, . . . , N−1, where N is the number of character-elements) is defined by a distance D[i][0] to the nearest leftward element, a distance D[i][1] to the nearest rightward element, a distance D[i][2] to the nearest upward element and a distance D[i][3] to the nearest downward element. In the further description, distances will be expressed in the above terms.

An example of the operation procedure of a character-element distance calculating portion 10 is as follows:

This procedure differs from that described in the first embodiment by only the number of directions, i.e., four directions in this embodiment but two directions in the first embodiment.

(1) Each element data D[i][j] (i=0, 1, . . . N−1, J=0) is initialized with a value UD that is equal to max(1x, 1y), where 1x is a horizontal width and 1y is a vertical height of a processable area.
(2) J=0
(3) k=0
(4) A distance between an i-th character-element and a j-th character-element is calculated in direction k (k=0 is a leftward direction, k=1 is a rightward direction, k=2 is an upward direction and k=3 is a downward direction).
(5) When a value d has been defined, D i][k]=min (D[i][k], d) is determined. Namely, D[i][k] is updated by d if d is smaller than the current D[i][k]. Nothing is done if d is undefined.
(6) k=k+1
(7) The process returns to step (5) if k is smaller than 2.
(8) j=j+1
(9) j+=1, if j==i.
(10) The process returns to step (4) if j is smaller than N.
(11) i=i+1
(12) The process returns to step (3) if i is smaller than N.

A line-direction deciding portion 12 examines the frequency of short distances between character-elements in horizontal and vertical directions with reference to the content of the character-element distance buffer 11 (Step 307) as follows:

Namely, the line-direction portion 12 first counts the number M[0] and the number M[1] for each i (i=0,1, . . . , N−1, where N is the number of character elements), which distance values satisfy the conditions:

max (D[i][0], D[i][1])<max (D[i][2], D[i][3]) (for M[0]) and max (D[i][0], D[i][1])>max (D[i][2], D[i][3]) (for M[1]).

In this embodiment, the UD value is given to D[i][] when D[i][ ] is undefined. This eliminates the need for special treatment of the case having an undefined D[i][ ] but does not represent the necessary condition as described for the first embodiment. The UD value is not limited to the shown value.

Next, the portion 12 decides the line is horizontal when M[0]>=M[1] and the line is vertical when M[0]<M[1] (Step 303). Values M[0] and M[1] may be otherwise defined and the correlation between the values and the line direction may be also modified. This embodiment may have another output signal indicating "the line direction cannot be decided" as described in the first embodiment.

Referring to FIGS. 10A to 10C, advantages of applying the above-described definitions of the distances will be described below.

With strings of characters written in vertical lines as shown in FIG. 10A, both the first and second embodiments can use commonly the character elements since they recognize a connected (continuous) part of each character as the character element.

In FIGS. 10B and 10C, arrows represent character elements to be stored for examination of distances in the corresponding areas of the character-element distance buffer 11. FIG. 10B shows the character elements to be used for defining distances between them by the first embodiment and FIG. 10C shows the character elements to be used for defining distances between them by the second embodiment.

As shown in FIG. 10B, the distance defining method of the first embodiment recognizes that a character element 102 has a nearest neighbor 103, a character element 103 has a nearest neighbor 102 and a character element 104 has a nearest neighbor 103 in the horizontal direction. In this case, distance values smaller than ordinary spacing between characters are stored in the character-element distance buffer 11. Such case may be reduced to occur by previously omitting too small elements from the scope of examination and may not arise any problem in practice since the direction of character lines is defined on the basis of the data of all character elements in a whole area.

In order to minimize the possibility of occurrence of the above-described case, the second embodiment extracts the nearest left and right neighbors of each objective character element in horizontal direction and selects farther one as a nearest character element for the objective character element. It also extracts the nearest upward and downward neighbors of each objective character element in vertical direction and selects the farther one as a nearest character element for the objective character element. As shown in FIG. 10C, a character 102 has a nearest neighbor 101 and a character element 104 has a nearest neighbor 105 in the horizontal direction, thus reducing the problem case as compared to the first embodiment. Namely, the second embodiment is intended to define the direction of character lines at increased accuracy.

<Third Mode for Carrying Out the Invention>

In another (third) embodiment of the present invention, the definition of a distance between character elements, which is used in the first embodiment, is so modified as to consider other directions in addition to the horizontal and vertical directions. Referring to FIGS. 2 and 3 in common, the distinction of the third embodiment from the first embodiment will be described below. Other portions of the embodiment are similar in function to those of the first embodiment.

A character-element distance calculating portion 10 calculates distances of each character element from its neighbors in different directions referring to the content of a character-element buffer 9 and stores the smallest of the distance values calculated for each character element in a character-element-distance buffer 11 (Step 306). At this step, the third embodiment defines distances in respective directions as follows:

First, the portion 10 determines a representative point on each character element, which may be, for example, a gravity center of the element or a center of a bounding rectangle of the element. The center of the bounding rectangle has an expression ((sx+ex)/2, (sy+ey)/2) when the rectangle is given coordinates (sx, sy) of its top left point and coordinates (ex, ey) of its below right point. However, the representative point of each character element is not restricted to the above described points.

The following example is described with character elements represented each by a center of a bounding rectangle.

Figure 11A:
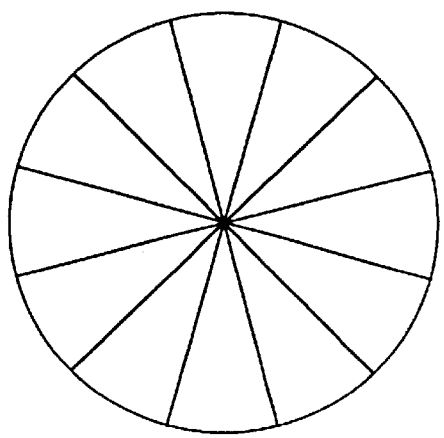
FIGS. 11A, 11B, 11C and 11D are illustrative of dividing the circumference of a circle into equal angular parts in the third embodiment of the present invention.

Distances from a character element to neighbors in respective different directions are defined as follows: A circle (360°) with center at a rectangle center is divided into a plurality of divisions. FIG. 11A illustrates a circle divided into 12 divisions at 30° intervals which are above 15° intervals. This divided circle is used in the further description. However, a circle may be divided into different number of angles that may be equal or not equal. It is, however, preferable that every dividing line passes the center of the circle and intersects with the circumference at two points thereon.

Figure 11B:
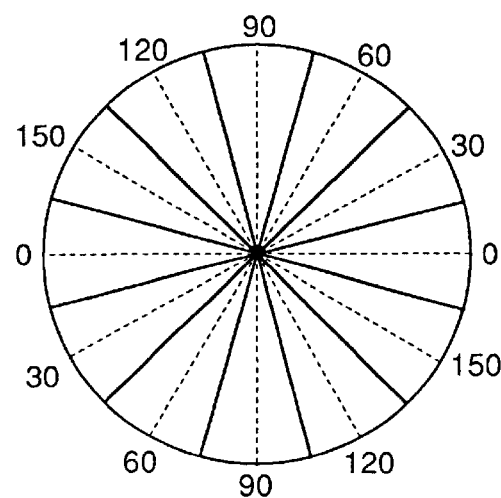

This is because angles different from each other by 180° are considered as the same direction. A direction of each division is defined by a center angle of each division when the angle is smaller than 180°. When the center angle of a division exceeds 180°, the direction of the division is defined by subtracting 180° from the angle. For example, the characters of FIGS. 11A to 11D may be divided into divisions (directions) with dividing angles of 0, 30, . . . , 150, 0, 30, . . . , 150 degrees as shown in FIG. 11B.

Now, it is supposed that the horizontal direction is of 0° and the vertical direction is of 90°. A distance from a representative point of an objective character element I to a representative point of any character element II can be measured. A distance d between two points is defined as a length of a segment connecting these two points. A square of the segments may also be used in the same logic. Other distance measures, e.g., a city block distance (a sum of a difference between x-coordinate values and a difference between two y-coordinate values) can be also applied as the occasion requires.

Figure 11C:
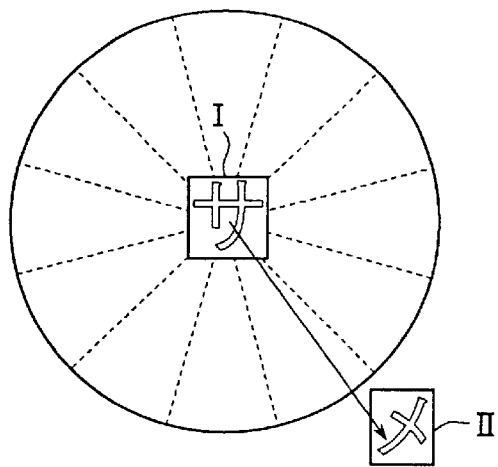

The segment connecting two points is included in one of the divisions of the circle with center at the representative point of the character element I as shown in FIG. 11C. In this instance, it is assumed that the direction of the character elements I and II is a direction indicated by the division in which the segment included (i.e., a center angle of the division) and the distance between the character elements I and II is equal to "d." In this instance, a distance between the elements I and II is not defined in any other direction.

Figure 11D:
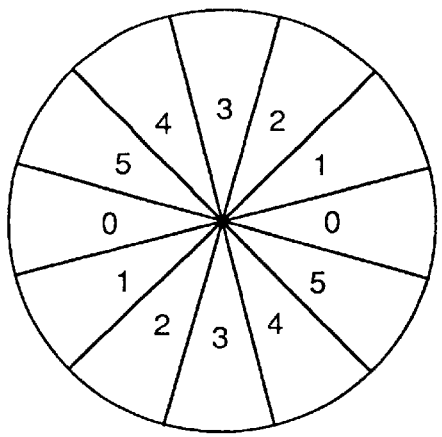

Angles of the divisions are given numbers as shown in FIG. 11D. These numbers are used for corresponding angles to respective arrangements. This example may be changed by any other method of correlating the angles and arrangements. A distance between an i-th character element (i=0, 1, . . . N−1 where N is the number of the character elements) to a j-th character element (j=0, 1, . . . 5) being the nearest neighbor is represented as D[i][j].

FIG. 12 shows an exemplified construction of the character-element distance buffer 11 adapted to store the distance data. The buffer 11 two-dimensionally stores the data, i.e., vertically arranged records correspond to respective character-elements and horizontally arranged records correspond to distances from each character-element to its neighbors in respective directions. As the shown case provides six numbered directions, the buffer 11 has six areas in the horizontal direction.

The operation of the character-element distance calculating portion 10 is, for example, as follows:

In different from the first embodiment, the third embodiment defines distances between two character elements in one of various directions. Namely, the distance between two optional character elements I and II is always defined in one direction. The procedure can be thus simplified.

(1) Each element D[i][j] (i=0, 1, . . . N−1, J=0) is initialized with a value UD that is equal to max(1x, 1y), where 1x is a horizontal width and 1y is a vertical height of a processable area.

(2) i=0

(3) J=0

(4) A distance between an i-th character-element and a j-th character-element is calculated in a direction k (k=0, 1, . . . 11).

(5) When a value d has been defined, D[i][k]=min (D[i][k], d) is determined. Namely, D[i][k] is updated by d if d is smaller than the current D[i][k].

(6) j=j+1

(7) j+=1, if j==i.

(8) The process returns to step (4) if j is smaller than N.

(9) i=i+1

(10) The process returns to step (3) if i is smaller than N.

In this embodiment, the UD value is given to D[i][ ] when D[i][ ] is undefined. This eliminates the need for special treatment of the case having an undefined D[i][ ] but does not represent the necessary condition as described for the first embodiment. The UD value is not limited to the shown value.

A line-direction deciding portion 12 examines the frequency of short distances between character-elements in respective directions with reference to the content of the character-element distance buffer 11 and decides the direction in which character elements are arranged at the shortest distances (Step 307).

Namely, the line-direction portion 12 counts the number of character elements i for each objective character element i. More particularly, it counts: the number M[0] of character elements i (i=0, 1, . . . , N−1, where N is the number of character elements) whose distance values from the objective character element satisfy the condition D[i][0]=min (D[i][0], D[i][1], . . . , D[i][5]);

M[1] of i whose distance values satisfy the condition D[i][1]=min (D[i][0], D[i][1], . . . , D[i][5]);

M[2] of i whose distance values satisfy the condition D[i][2]=min (D[i][0], D[i][1], . . . , D[i][5]);

M[3] of i whose distance values satisfy the condition D[i][3]=min (D[i][0], D[i][1], . . . , D[i][5]);

M[4] of i whose distance values satisfy the condition D[i][4]=min (D[i][0], D[i][1], . . . , D[i][5]); and M[5] of i whose distance values satisfy the condition D[i][5]=min (D[i][0], D[i][1], . . . , D[i][5]).

Next, the portion 12 determines a value j0 at which M[j0]=max(M[0], M[1]) is obtained and defines the value j0 to be a number code of the direction of lines. If there is a plurality of j0, the portion 12 considers that decision is impossible and sets j0 to be equal to the number of possible directions (6 in this instance). The definition of M[ ] and the correlation between M[ ] and the line directions are not limited to the above and may be otherwise modified as described before for the first embodiment.

The extraction of line directions by the above-described method is based upon the experimental fact that any document contains dense characters in the direction of character lines. The feature of detecting characters in directions other than horizontal and vertical directions can be not only used for pages having lines printed diagonally thereon but also for an image with tilted character lines, which have been input through a camera or a handy scanner.

Finally, a line-direction deciding portion 12 converts the value j0 indicating the direction of the highest frequency or other information (e.g., the decision being impossible) into an angle of the line direction or other information code with reference to a number-to-direction table 13 and outputs the converted value (Step 308). The number-to-direction table 13 is shown by way of example in FIG. 13. The output of the line-direction deciding portion 12 is transferred to a display unit 4 as shown in FIG. 2. Naturally, the output of the line-direction deciding device may be transferred through a suitable separate interface to any other device such as a character recognition device that needs the information as described before for the first embodiment.

<Fourth Mode for Carrying Out the Invention>

Instead of distances from each character to its neighbors as made in the third embodiment, another (fourth) embodiment calculates the density character elements in the neighborhood of each character element in a processable area, selects peak frequencies directions for respective character elements and defines the direction in which the highest frequency indicating the highest density of character elements in the area as the direction of the character lines in the area.

Figure 14:
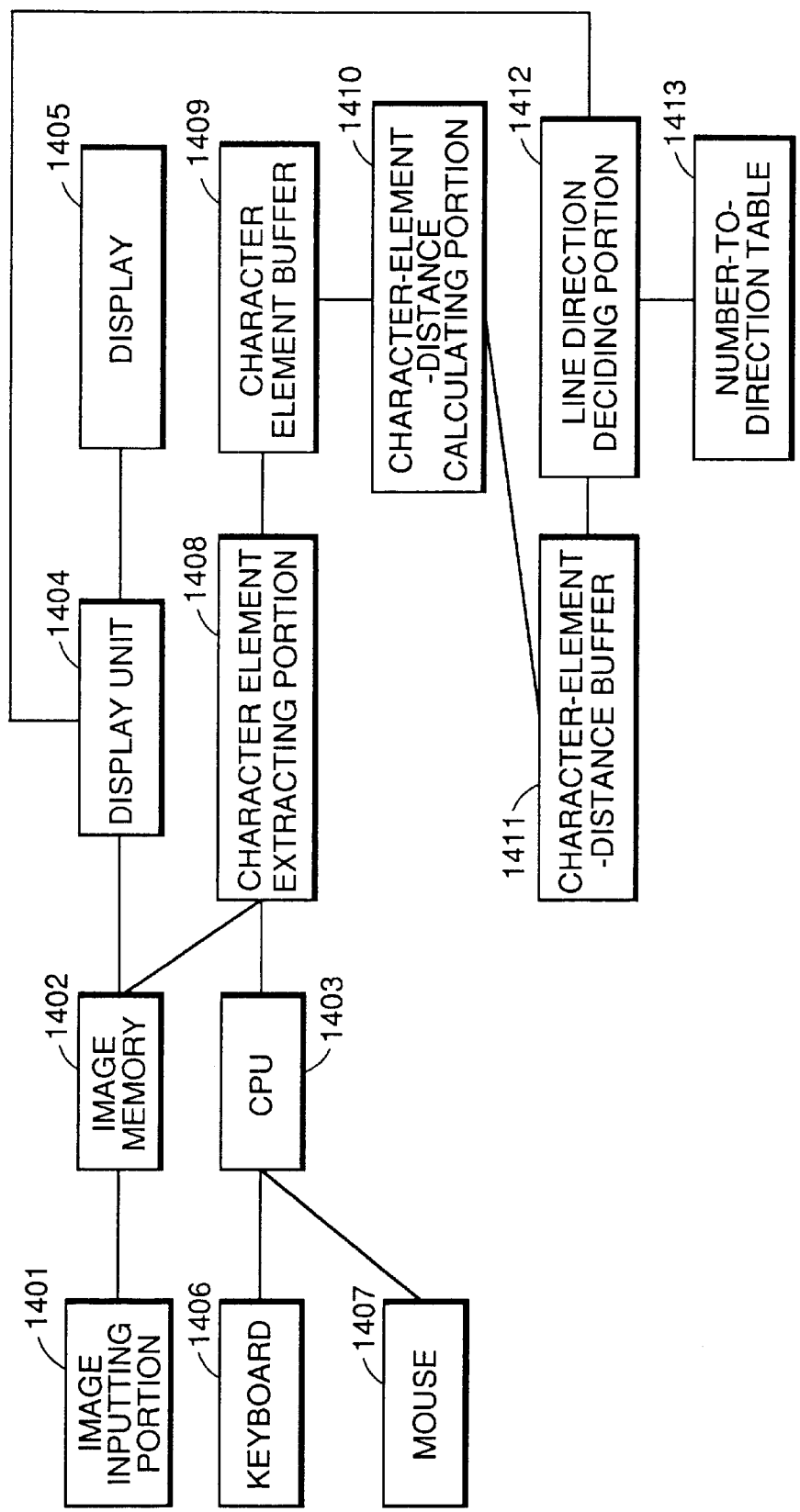
FIG. 14 is a block diagram showing a construction of an apparatus for carry-out a fourth embodiment of the present invention.

FIG. 14 is a block diagram of the fourth embodiment of the present invention. Numeral 1410 designates a character-element density calculating portion and numeral 1411 designates a character-element density buffer. The other portions are similar in function to those shown in FIG. 2.

Figure 15:
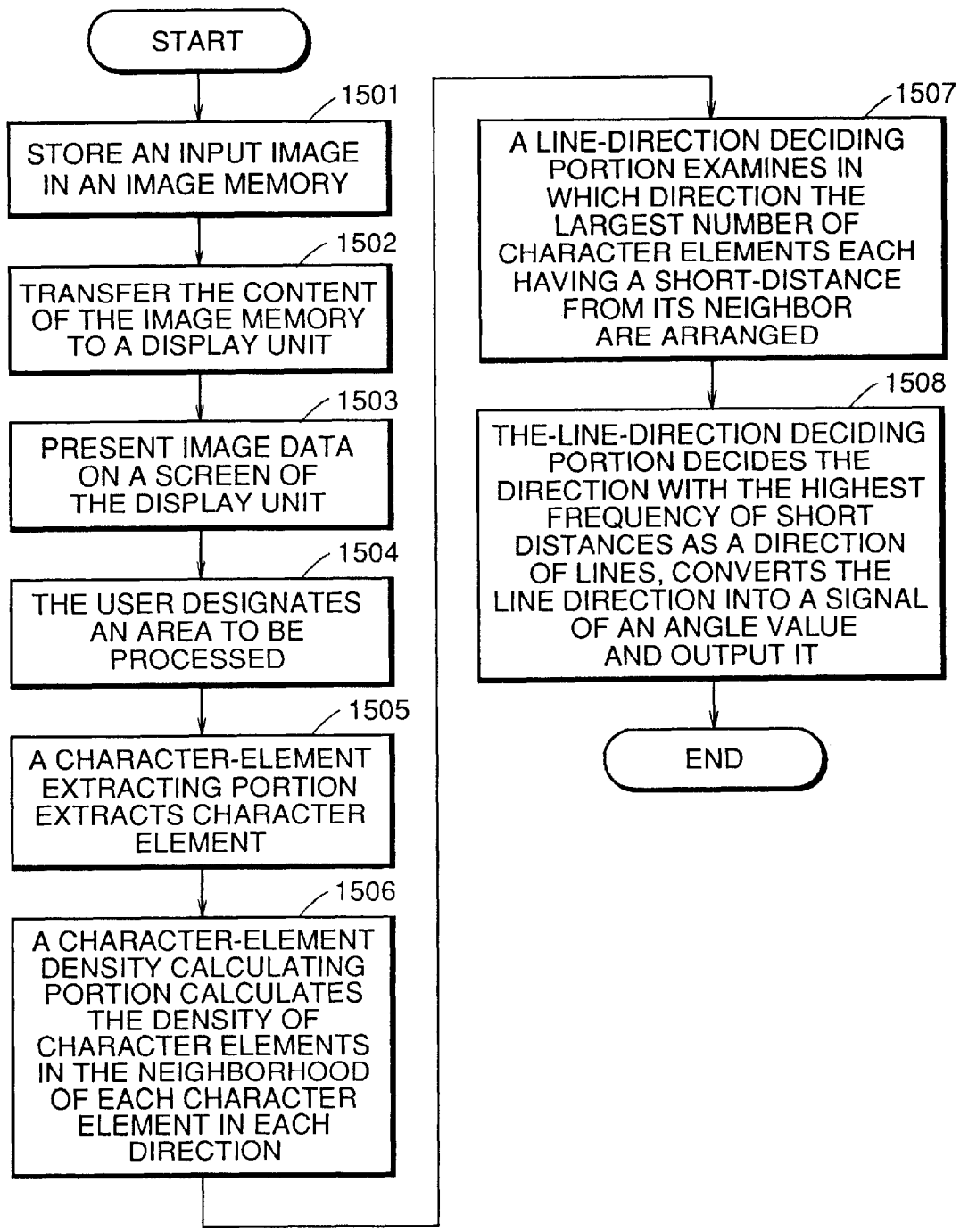
FIG. 15 is a flow chart describing a processing procedure for the fourth embodiment of the present invention.

FIG. 15 is a flow chart depicting the processing procedure of the fourth embodiment of the present invention. The procedure is the same as that shown in FIG. 2 excepting steps 1506 and 1507.

The difference of the fourth embodiment from the third embodiment is as follows:

The character-element density calculating portion 1410 calculates densities of character elements in the neighborhood of each of respective elements in each of respective directions in a processable area and stores obtained density values in the character-element density buffer 1411. The further explanation will be made with an example of character elements used in the third embodiment. It is of course possible to use other characters having otherwise defined representative points.

Figure 16B:
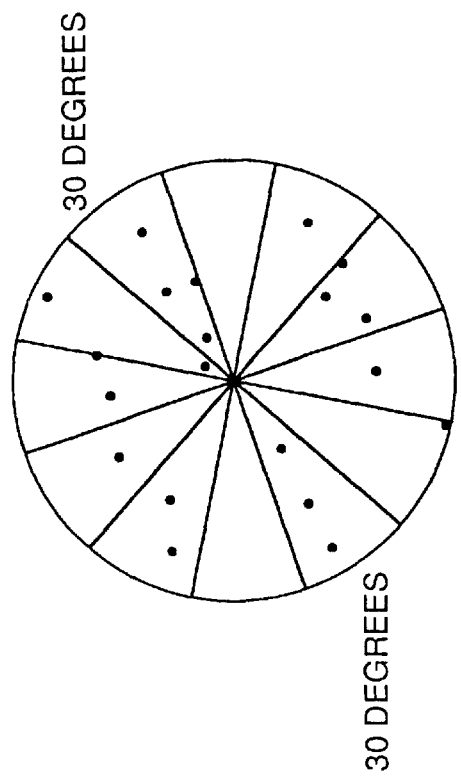
FIGS. 16A and 16B are view for explaining by way of example definition of character-element densities in respective directions for the fourth embodiment of the present invention.
Figure 16A:
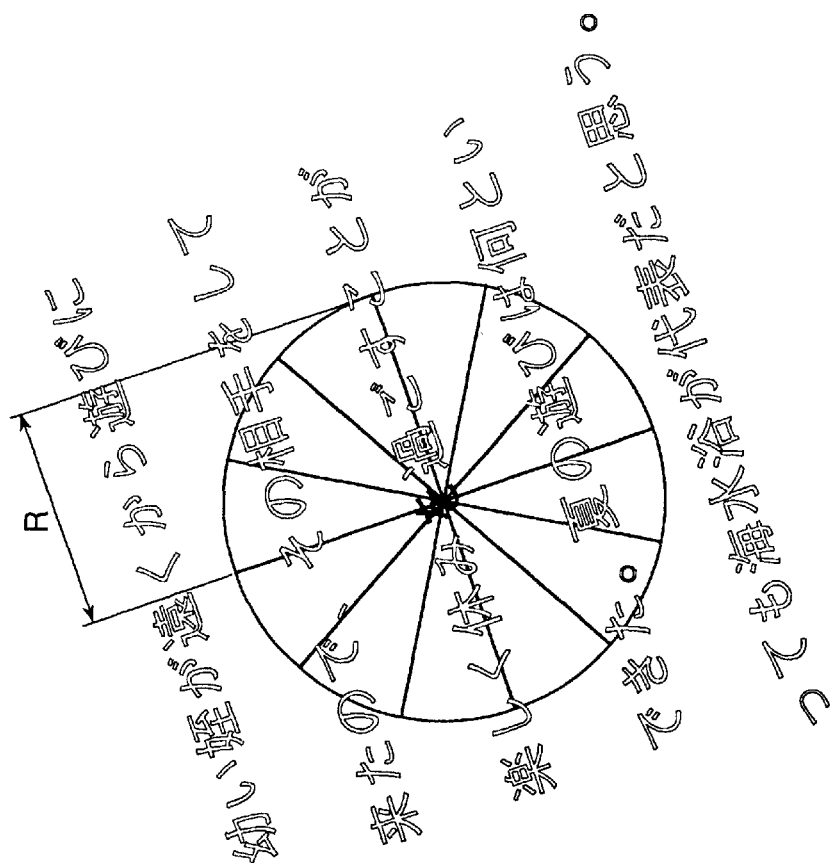

The density of character elements in the neighborhood of a character element is defined by way of example as follows:

As shown in FIGS. 16A and 16B, a circle having a radius R with center at a representative point of the character element is drawn and divided into divisions at an interval of a specified angle (30°). The number of representative points of surrounding character elements in a division is determined as the density of the character elements in the direction corresponding to the direction of the division. In FIGS. 16A and 16B, there is shown a plurality of character elements distributed in the neighborhood of the character-element at the center of the circle.

Angular divisions of the circle are made, for example, as shown in FIG. 11A and directions of respective divisions are numbered for example as shown in FIG. 11B. It is of course possible to use an otherwise divided circle and otherwise numbered divisions as described in the third embodiment.

FIG. 16B shows the distribution of representative points of surrounding character elements within the same circle of FIG. 16A. The representative points of the character elements out of the radius of the circle are omitted. As seen in FIG. 16B, the largest number of representative points is included in divisions corresponding to an angle of 30° at the center of the circle. Namely, a sum of points included in two divisions represented by an angle of 30° in FIG. 16B is largest as compared with counts in all other paired divisions. It is apparent that character elements are most densely distributed in this angular direction.

The processing procedure at step 1506 will be described below, using the numerical representation of division directions as shown in FIG. 11D. In this instance, the density of character elements surrounding an i-th character element (i=0, 1. . . N−1 where N is the number of character elements) in a direction toward a j-th character element is expressed as D[i][j].

(1) Each element D[i][j] (i=0, 1, . . . N−1, J=0, 1, . . . , 5) is initialized by zero.

(2) i=0

(3) J=0

(4) The number of representative points included in an angular division in a direction from the i-th character-element to the j-th character-element is counted and stored in D[i][j].

(5) j=j+1
(6) The process returns to step (4) if j is smaller than 6.
(7) i=i+1
(8) The process returns to step (3) if i is smaller than N.

Referring to the content of the character-element density buffer 1411, the line-direction deciding portion 1412 examines in which direction the surrounding characters for each character element are more densely distributed (Step 1507). Namely, the line-direction portion 1412 counts: the number M[i] of character elements i (i=0, 1, . . . , N−1, where N is the number of character elements) whose distances from each objective character element i satisfy the condition D[i][0]=min (D[i][0], D[i][1], . . . , D[i][5]);

M[1] of i whose distance values satisfy the condition D[i][1]=min (D[i][0], D[i][1], . . . , D[i][5]);

M[2] of i whose distance values satisfy the condition D[i][2]=min (D[i][0], D[i][1], . . . , D[i][5]);

M[3] of i whose distance values satisfy the condition D[i][3]=min (D[i][0], D[i][1], . . . , D[i][5]);

M[4] of i whose distance values satisfy the condition D[i][4]=min (D[i][0], D[i][1], . . . , D[i][5]); and M[5] of i whose distance values satisfy the condition D[i][5]=min (D[i][0], D[i][1], . . . , D[i][5]).

Next, the portion 1412 determines a value j0 at which M[j0]=max(M[0], M[1]) is obtained and defines the value j0 as the number indicating the direction of lines. If there is a plurality of j0, the portion 12 considers that decision is impossible and sets j0 to be equal to the number of possible directions (6 in this instance).

The definition of M[ ] and the correlation between M[ ] and the line direction are not limited to the above and may be otherwise modified as described before for the third embodiment.

<Fifth Mode for Carrying Out the Invention>

Another (fifth) embodiment of the present invention is an image inclination correcting device that extracts a direction of character lines other than horizontal and vertical lines on an input text image by using the function of the third embodiment, determines inclination of the image by comparing the direction of the extracted character lines with a known direction of the lines on the original and correct the image for the detected inclination.

Figure 18:
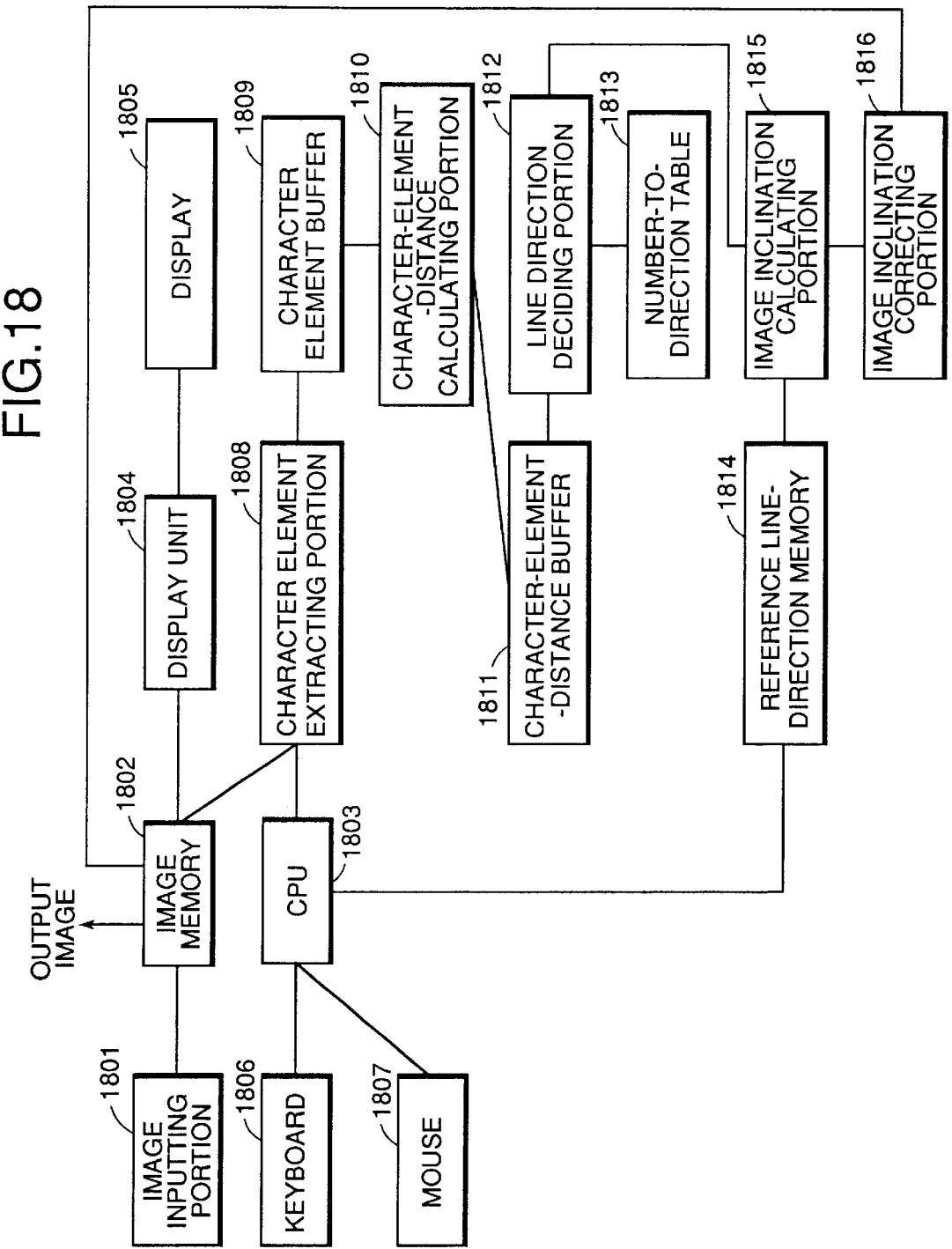
FIG. 18 is a block diagram showing a construction of an apparatus for carry-out a fifth embodiment of the present invention.
Figure 19:
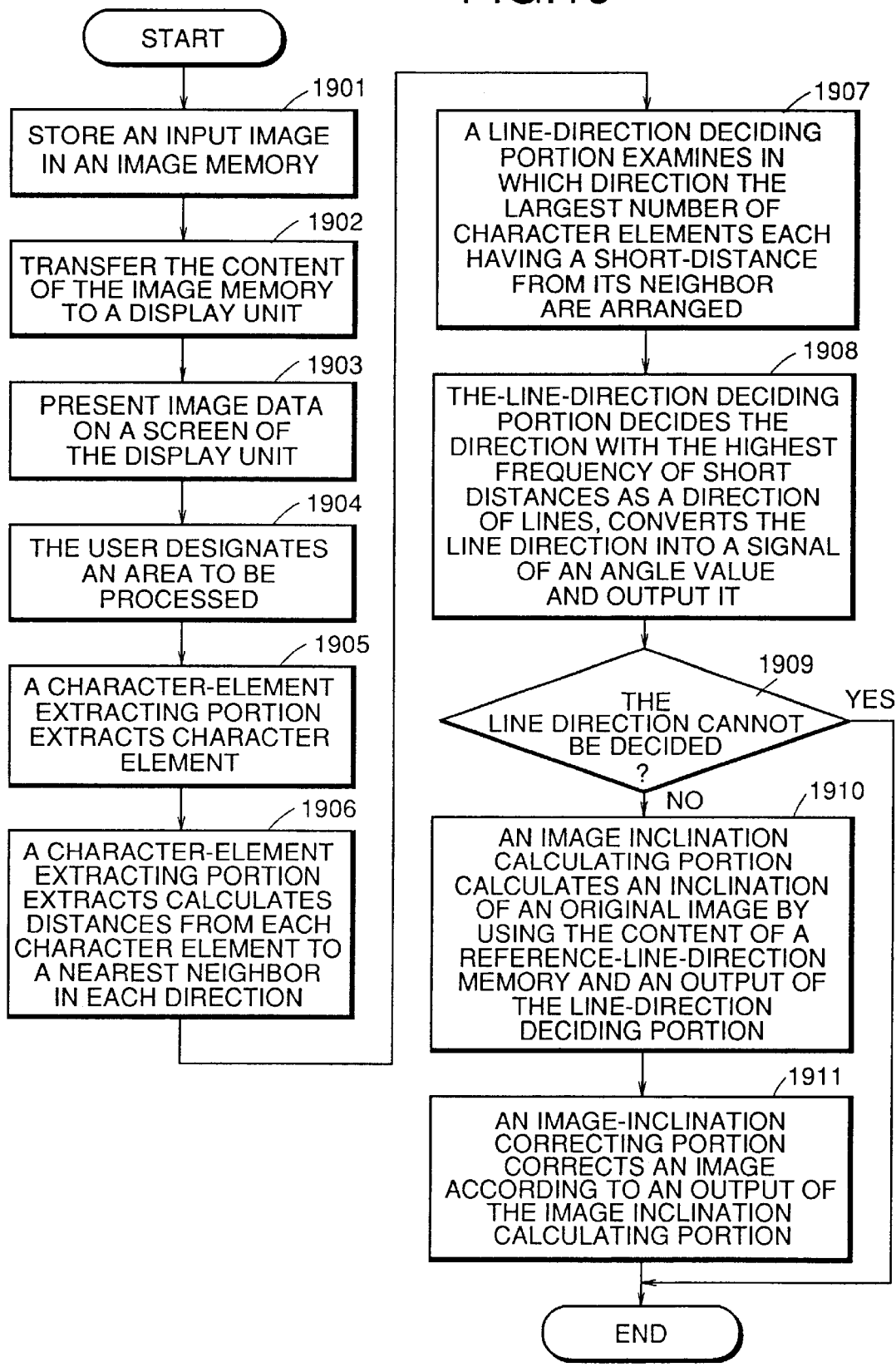
FIG. 19 is a flow chart describing the steps of processing an image by the fifth embodiment of the present invention.

FIG. 18 is a block diagram of the image inclination correcting device that is the fifth embodiment of the present invention. FIG. 19 is a flow chart depicting the processing operation of the fifth embodiment of the present invention. Referring to FIGS. 18 and 19, the operation of the embodiment will be described below:

In the fifth embodiment, a line-direction deciding portion 1813 determines a value j0 indicating the direction of highest frequency of character elements or the impossibility of judgment and converts the value j0 into an angle of the line direction or other suitable signal, referring to a number-to-direction table, and outputs the converted signal (Step 1908). The procedure to the Step 1908 is the same as that of the third embodiment excepting the following operations:

When designating an area to be processed on an input image by using a keyboard 1807 or a mouse 1808 (Step 1904), the user also enters the correct direction of lines within the processable area, which data is stored into a reference line direction memory under the control of a CPU 1803. The user may enter the reference data in various ways. In this instance, the user inputs digits of an angle through the keyboard 1807 into the CPU 1803.

The line-direction deciding portion 1812 may also select either vertical (90°) or horizontal (0°) direction as a correct line direction that is close to its output angle. This method is useful if two following premises are satisfied. In this case, the reference line-direction input memory 1814 can be omitted.

(1) The direction of lines is either vertical or horizontal.

(2) The inclination of an original is sufficiently smaller than 90 degrees. In this instance, the user is not requested to enter an angle of the correct line direction. This can further simplify the operation of the device.

At Step 1908, an image inclination calculating portion 1815 receives a signal output from the line-direction deciding portion 1812 and calculates an angle of inclination of the image by comparing the received output signal to the reference data stored (at Step 1904) in the reference line-direction memory 1814 excepting the case when the received output signal indicates, not an angle of line direction, the impossibility of judgment (Step 1909). When the line direction is, for example, of 30° at the output of the line-direction deciding portion 1812 and the reference line-direction is of 30°, the inclination of the image is detected to be of zero degree. When the line direction is, for example, of 0° at the output of the line-direction deciding portion 1812 and the reference line-direction is of 30°, the inclination of the image is detected to be of −30° degrees. The processing result is transferred to an image-inclination correcting portion 1816 (Step 1910).

The image inclination correcting portion 1816 adds a reverse rotation angle corresponding to the calculated inclination angle of the image to the image data stored in the image memory 1802 in order to cancel the effect of the estimated inclination of the image (Step 1911). The image inclination correcting portion 1816 can rotate the image by using a suitable known technique, for example, disclosed in Japanese Laid-open Patent Publication No. 63-191192.

The line-direction deciding device according to the present invention can decide the direction of lines of characters by using local density of elements composing respective characters without being affected by large-area features of a complicated-layout image.

The line-direction deciding device according to the present invention can decide the direction of lines of characters by processing character-composing elements and can therefore use character elements already extracted for any other purpose as they are. The device can also extracts' character elements newly by itself, which are used not only for deciding the line direction but also for further use in the character recognizing device.

The line-direction deciding device according to the present invention can distinguish any direction other than horizontal and vertical line directions if the direction different from the vertical and horizontal directions by a specified angle or more. Therefore, the device can be used with input signals from wide kinds of inputting devices, e.g., a handy scanner and a camera. The line-direction deciding device can decide diagonal line-directions without frequently accessing the image memory since the line-direction deciding process does not concern the stage of extracting character elements.

The image-inclination detecting device and the image-inclination correcting device according to the present invention are realized by using the above-described features of the line-direction deciding device according to the present invention and by adding a small amount of processing. Accordingly, these devices may have very high efficiency of performance when being used in combination with the line-direction deciding device of the present invention.

What is claimed is:

1. A line-direction deciding device comprising:
   image storing means for storing an input image;
   character-element extracting means for extracting character elements from the image stored in the image storing means;
   character-element distance calculating means or character-element density calculating means for determining the density of character elements in each of a plurality of predetermined directions; and
   line-direction deciding means for detecting a direction in which character elements are most densely distributed, and deciding a character line direction in the image as the detected direction in which the character elements are most densely distributed,
   wherein the character-density calculating means includes means for determining first the shortest distance from a character element to a neighboring character element in each opposite direction of the predetermined directions and then deciding the largest of the distances determined in the each opposite direction as the character-element distance in the predetermined direction and the line-direction deciding means compares the character-element distances in respective predetermined directions and decides by majority the direction in which character-elements are most densely distributed.

2. A device for determining a direction in which characters are written, comprising:
   a memory that stores an image;
   a character element extracting portion that extracts character elements from the stored image;
   a character element distance calculating portion that calculates for each character element the distances to two neighboring character elements on opposite sides thereof along each of two or more different directions and stores for each character element the greater of the two calculated distances to neighboring character elements along each of the two or more different directions; and
   a character writing direction deciding portion that decides for each character element, based on the stored distances, which of the two or more directions is the direction of its nearest neighboring character element, that maintains for each direction a count of the number of times that the nearest neighboring character element of the respective character elements is in that direction, and that determines the direction in which characters are written as being the direction associated with the highest count.

3. The device according to claim 2, wherein the two or more directions comprise the horizontal and vertical directions.

4. The device according to claim 2, wherein the character element distance calculating portion calculates distances based on bounding rectangles associated with the extracted character elements.

5. The device according to claim 2, wherein the character element distance calculating portion calculates distances based on center points of the extracted character elements.

6. A line-direction deciding device comprising:
   image storing means for storing an input image;
   character-element extracting means for extracting character elements from the image stored in the image storing means;
   character-element distance calculating means or character-element density calculating means for determining the local density of character elements in each of a plurality of predetermined directions in the neighborhood of each character element; and
   line-direction deciding means for detecting a direction in which character elements are most densely distributed using the local density in the neighborhood of each character element thus calculated, and deciding a character line direction in the image as the detected direction in which the character elements are most densely distributed,
   wherein the character-density calculating means includes means for determining first the shortest distance from a character element to a neighboring character element in each opposite direction of the predetermined directions and then deciding the largest of the distances determined in the each opposite direction as the character-element distance in the predetermined direction and the line-direction deciding means compares the character-element distances in respective predetermined directions and decides by majority the direction in which character-elements are most densely distributed.

7. A line-direction deciding device as defined in claim 6, wherein
   the predetermined plural directions are directions of divisions formed by dividing a circle centered at a representative point of a bounding rectangle of the character element, and
   the character element density is determined by the number of representative points of bounding rectangles of respective character elements, said points being included in divisions of the circle.

8. A device for determining a direction in which characters are written, comprising:
   a memory that stores an image;
   a character element extracting portion that extracts character elements comprising pixels from the stored image;
   a character element distance calculating portion that calculates for each character element the shortest distance to a neighboring character element along each of two or more different directions and that stores for each character element the calculated shortest distance to a neighboring character element along each of the two or more different directions; and
   a character writing direction deciding portion that decides for each character element, based on the stored distances, which of the two or more directions is the direction of its nearest neighboring character element, that maintains for each direction a count of the number of times that the nearest neighboring character element of the respective character elements is in that direction, and that determines the direction in which characters are written as being the direction associated with the highest count,
   wherein the character element distance calculating portion stores a predetermined value for those character elements for which the shortest distance to a neighboring character element in a particular direction cannot be determined.

9. The device according to claim 8, wherein the predetermined value is the greater of (1) a processable area of the image in a horizontal direction and (2) a processable area of the image in a vertical direction.

10. The device according to claim 8, wherein the character element distance calculating portion ignores those character elements for which the predetermined value is stored when calculating the shortest distance to a neighboring character element for other character elements.

11. The device according to claim 8, wherein a distance to a neighboring character element along one direction is defined only when the coordinate ranges in another, different direction of two bounding rectangles of the character elements are overlapped, the directions being perpendicular to each other.

12. A device for determining a direction in which characters are written, comprising:

a memory that stores an image;

a character element extracting portion that extracts character elements from the stored image;

a character element density calculating portion that calculates for each character element the density of character elements in the neighborhood thereof by generating a circle of predetermined radius that is centered within the character element, dividing the circle into a number of sections, counting the number of character elements in each section, and storing for each character element the number of character elements in each section; and a character writing direction deciding portion that decides for each character element, based on the stored numbers of character elements, which of the sections is the section containing the greatest number of character elements, that maintains for each section a count of the number of times that the greatest number of characters is in that section, and that determines the direction in which characters are written as being the direction associated with the section having the highest-count.

* * * * *